(12) United States Patent
Ranta et al.

(10) Patent No.: US 7,509,145 B2
(45) Date of Patent: Mar. 24, 2009

(54) TRANSMISSION METHOD AND BASE TRANSCEIVER STATION

(75) Inventors: Pekka A. Ranta, Nummela (FI); Harri Jokinen, Pertteli (FI); Mikko Säily, Oulu (FI); Kari Niemelä, Oulu (FI)

(73) Assignee: Nokia Corporation, Espoo (FI)

( * ) Notice: Subject to any disclaimer, the term of this patent is extended or adjusted under 35 U.S.C. 154(b) by 1231 days.

(21) Appl. No.: 10/679,501

(22) Filed: Oct. 7, 2003

(65) Prior Publication Data

US 2005/0009473 A1 Jan. 13, 2005

(30) Foreign Application Priority Data

Jul. 10, 2003 (FI) .................................. 20031053

(51) Int. Cl.
 *H04M 1/00* (2006.01)
(52) U.S. Cl. .................... 455/562.1; 455/101; 370/336; 375/132; 375/138
(58) Field of Classification Search ................ 455/73, 455/561, 562.1, 101; 370/328, 336, 337; 375/130, 132, 219, 138
See application file for complete search history.

(56) References Cited

U.S. PATENT DOCUMENTS 6,567,459 B1 * 5/2003 Hakkinen et al. ........... 375/132

FOREIGN PATENT DOCUMENTS

| EP | 1 303 059 A1 | 4/2003 |
| WO | WO 95/32558 | 11/1995 |

OTHER PUBLICATIONS

Heath, Robert et al., "*Transmit Diversity Using Decision-Directed Antenna Hopping*", Communication Theory Mini-Conference, Jun. 10, 1999, pp. 141-145.
Olofsson, H. et al., "*Transmitter Diversity With Antenna Hopping For Wireless Communication Systems*", Vehicular Technology Conference, 1997 IEEE 47th publication date May 407, 1997 vol. 3, pp. 1743-1747.

* cited by examiner

*Primary Examiner*—Quochien B Vuong
(74) *Attorney, Agent, or Firm*—Squire, Sanders & Dempsey, LLP

(57) ABSTRACT

A transmission method and a base transceiver station applying antenna hopping between at least two antenna elements are provided. According to one embodiment of the invention, a carrier carrying a first signal and a second signal is transmitted. At least a portion of the first signal is subjected to a measurement for adjusting receive characteristics of a mobile station for the reception of at least a portion of the second signal. Antenna hopping is applied to the carrier such that the at least a portion of the first signal and the at least a portion of the second signal are transmitted during an interval between two consecutive antenna hops between the at least two antenna elements.

35 Claims, 3 Drawing Sheets

TRANSMISSION METHOD AND BASE TRANSCEIVER STATION

BACKGROUND OF THE INVENTION:

1. Field of the Invention

The invention relates to a transmission method and a base transceiver station in a cellular telecommunication system.

2. Description of the Related Art

Transmit diversity, especially transmit antenna diversity, is an attractive means of obtaining diversity gain against fading mechanisms, such as Rayleigh fading, of a radio channel in telecommunications systems. An approach for providing diversity gain by way of antenna diversity is an antenna hopping method, which consists of transmitting consecutive information bursts from a base transceiver station by using different antennas. An antenna transmitting the information burst may be selected based on a periodical or pseudorandom antenna hopping sequence, for example. The gain in transmission is achieved provided that the radio channels transmitted from each antenna are exposed to different multi-path fading.

A characteristic of the antenna hopping method arises from discontinuity in the base transceiver station transmission when the transmitting antenna is changed from one to another. The discontinuity poses difficulties when a carrier subjected to the antenna hopping is required to provide correlated time slots, for example, for channel characterization purposes. The problem of discontinuity occurring in such carriers may be solved by leaving out such carriers from the antenna hopping, and by confining the antenna hopping to carriers in which the problem of discontinuity is small compared to the gain obtained with the antenna hopping.

A portion of time slots transferred by a carrier left out from the antenna hopping, however, may be used in information payload transmission, and leaving carriers out from the antenna hopping results in latent radio resources. Therefore, it would be a great benefit to be able to increase the number of carriers to which the antenna hopping may be applied.

SUMMARY OF THE INVENTION

The invention provides a transmission method and a base transceiver station. According to one embodiment of the invention, there is provided a transmission method in a base transceiver station of a cellular telecommunication system. The base transceiver station applies antenna hopping between at least two antenna elements. The method includes steps of transmitting and applying. The transmitting step transmits a carrier carrying a first signal and a second signal, at least a portion of the first signal being subjected to a measurement for adjusting receive characteristics of a mobile station for reception of at least a portion of the second signal. The applying step applies antenna hopping to the carrier such that the at least a portion of the first signal and the at least a portion of the second signal are transmitted during an interval between two consecutive antenna hops between the at least two antenna elements.

According to a second embodiment of the invention, there is provided a base transceiver station of a cellular telecommunication system. The base transceiver station includes a signal generating unit, a transmitter, at least two antenna elements and an antenna hop generator. The signal generating unit generates a first signal and a second signal. The first signal is subjected to a measurement for adjusting receive characteristics of a mobile station for reception of at least a portion of the second signal. The transmitter unit connected to the signal generating unit generates a carrier carrying the first signal and the second signal. The at least two antenna elements operationally connected to the transmitter unit transmit the carrier carrying the first signal and the second signal. The antenna hop generator operationally connected to the transmitter unit applies at least two antenna hops to the carrier such that the at least a portion of the first signal and the at least a portion of the second signal are transmitted during an interval between two consecutive antenna hops between the at least two antenna elements.

According to a third embodiment of the invention, there is provided a base transceiver station of a telecommunication system. The base transceiver station includes a transmitting mechanism and an applying mechanism. The transmitting mechanism transmits a carrier carrying a first signal and a second signal. At least a portion of the first signal is subjected to a measurement for adjusting receive characteristics of a mobile station for reception of at least a portion of the second signal. The applying mechanism applies antenna hopping to the carrier such that the at least a portion of the first signal and the at least a portion of the second signal are transmitted during an interval between two consecutive antenna hops between the at least two antenna elements.

The method and system of the invention provide several advantages. One advantage of the invention is that a carrier otherwise excluded from the antenna hopping may be subjected to antenna hopping, thus improving diversity gain of the channels transmitted using the otherwise excluded carrier. Furthermore, the invention permits the inclusion of the otherwise excluded carrier in the frequency hopping sequence.

BRIEF DESCRIPTION OF THE DRAWINGS:

In the following, the invention will be described in greater detail with reference to the preferred embodiments and the accompanying drawings, in which.

Figure 1:
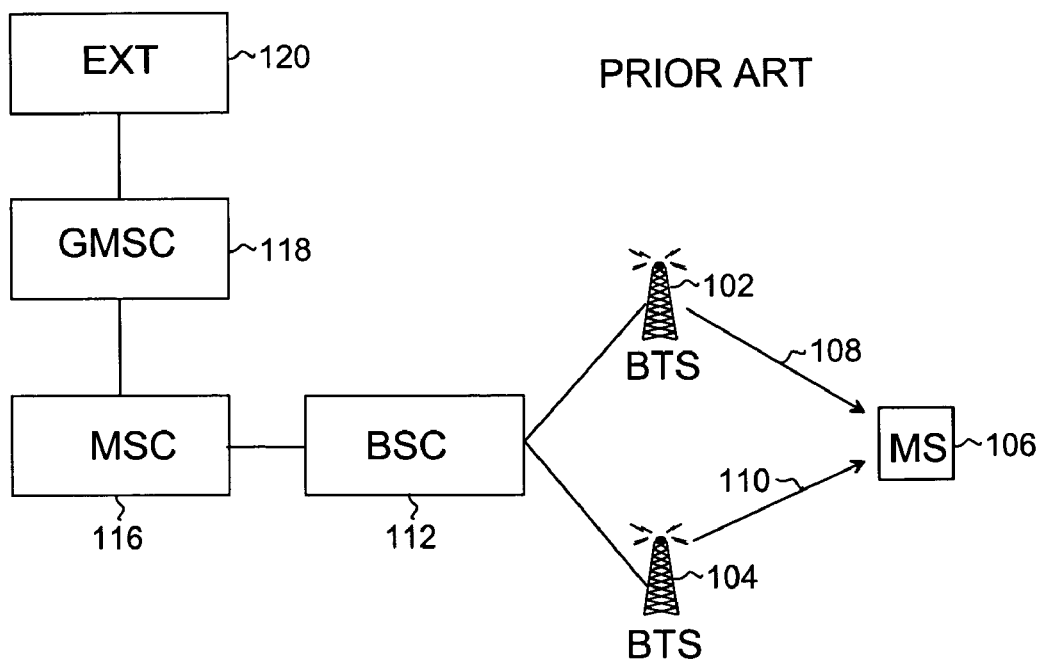
FIG. 1 shows an example of a structure of a cellular telecommunication system.

DETAILED DESCRIPTION OF THE PREFERRED EMBODIMENTS:

FIG. 1 illustrates an example of a simplified structure of a telecommunication system to which the invention may be applied.

The cellular telecommunications system is based on, for example, a GSM (Global System for Mobile Communications) radio access technology or WCDMA (Wideband Code Division Multiple Access) technology. The structure and function of cellular telecommunications systems are known to one skilled in the art, and only network elements relevant to the invention will be described.

In the example shown in FIG. 1, the network elements are presented in terms of GSM terminology using circuit-switched network elements without restricting applications of the invention to the GSM system.

The cellular telecommunication system may include a mobile switching center (MSC) 116 enabling circuit-switched signalling in the cellular telecommunications system.

In this embodiment, the cellular telecommunications system may also include a gateway mobile services switching center 118 (GMSC). The gateway mobile services switching center attends to the circuit-switched connections between the core network including the mobile switching center 116 and the gateway mobile services switching center 118, and external networks (EXT) 120, such as a public land mobile network (PLMN) or a public switched telephone network (PSTN).

The mobile switching center 116 controls a radio access network including at least one base station controller (BSC) 112 and a base transceiver station (BTS) 102, 104 controlled by the base station controller 112. The base station controller 112 exemplifies a network element, such as a radio network controller (RNC), which acts as an interface between the core network and the radio access network. The base transceiver station 102, 104 may exemplify a network element implementing the radio interface for transferring a signal 108, 110 from the radio access network to the mobile station 106. The invention is not, however, restricted to the presented exemplary structure of the cellular telecommunication system, but can be applied to any cellular telecommunication system.

In this example, the cellular telecommunication system may further include mobile station 106 for providing a user with access to the cellular telecommunication system. The mobile station 106 may include conventional components, including wireless modems, processors with software, memory, a user interface, and a display. The structure and functions of the mobile station 106 are known to one skilled in the art, and thus will not be described in detail.

Figure 2:
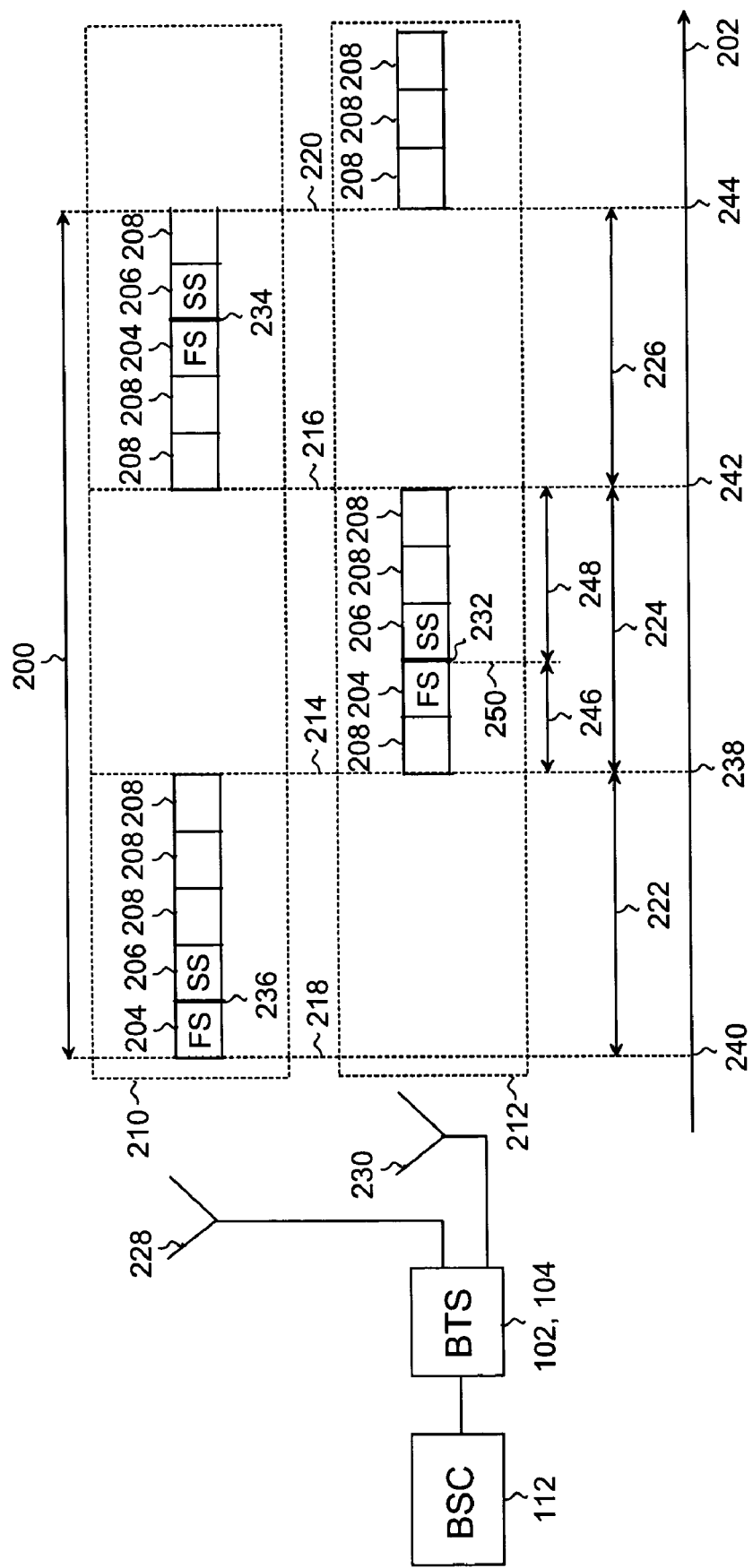
FIG. 2 shows an example of a structure of a cellular telecommunication system and a timing chart of an antenna hopping sequence.

FIG. 2 shows an example of a base transceiver station 102, 104 and a timing chart of an antenna hopping sequence 200. The timing of the signals in the timing chart is expressed with respect to a time axis 202 showing time in arbitrary scale.

A carrier carrying a first signal 204 and a second signal 206 is transmitted from the base transceiver station 102, 104. The first signal 204 provides a signal strength reference for the second signal 206 such that when subjected to a measurement in a mobile station 106, the receive characteristics of a mobile station 106 may be adjusted properly for receiving the second signal 206.

In an embodiment of the invention, the carrier carries a third signal 208. The third signal may transfer, for example, user traffic or control signals between the base transceiver station 102, 104 and the mobile station 106.

The initiation of the measurement of the first signal may be based on, for example, a priori knowledge on a relative position of the second signal 206 and the first signal 204, and an indication of the arrival of the second signal 206 to the mobile station 106. The arrival of the second signal 206 to the mobile station 106 may be indicated by synchronization information provided by, for example, the synchronization channel (SCH) and/or the frequency correction channel (FCCH).

The adjustment of the receive characteristics in the mobile station 106 may be needed, for example, for applying an analog-to-digital conversion to the second signal 206 with optimized dynamic range and decoding the second signal 206.

In an embodiment, the measurement in the mobile station may be a power measurement and the receive characteristic may include a receive gain of the receiver of the mobile station 106. The mobile station may, for example, determine an RSSI (Receiving Signal Strength Indicator) by way of the power measurement, and adjust the receive gain based on the RSSI value in order to optimize the reception of the second signal 206.

In a general description of antenna hopping as shown in the example of FIG. 2, a transmission of a carrier carrying the first signal 204 and the second signal 206 is shifted from one spatial transmission channel 210, 212 to another by way of an antenna hop 214, 216, 218, 220 performed between at least two antenna elements 228, 230. In an embodiment shown in FIG. 2, during an interval 222, 224, 226 between two consecutive antenna hops 218, 214, 216, 220, the transmission power of the carrier remains constant. The antenna hop 214, 216, 218, 220 results in discontinuity in the spatial transmission channel 210, 212. The discontinuity reduces correlation between the signals in which the discontinuity takes place. A spatial transmission channel 210, 212, in general, is a composition of signal paths between the base station 102, 104 and the mobile station 106. The difference between two different spatial transmission channels 210, 212 may be characterized by, for example, their different fading patterns.

According to the invention, antenna hopping may be applied to the carrier carrying the first signal 204 and the second signal 206 such that at least a portion of the first signal 204 and at least a portion of the second signal 206 are transmitted during an interval 224 between two consecutive antenna hops 214 and 216 performed between the at least two antenna elements 228 and 230. When applying antenna hopping to the carrier in the presented manner, spatial transmission channel discontinuity is avoided between the first signal 204 and the second signal 206. This feature improves the correlation between the first signal 204 and the second signal 206, and releases the diversity gain resources concealed in the carrier. The diversity gain is obtained, for example, by using different antenna for consecutive occurrences of the first signal 204 and the second signal 206. Furthermore, an improved correlation results in an enhanced receive characteristic adjustment and gain in the quality of the reception of the second signal 206.

In an embodiment shown in FIG. 2, the first signal 204 and the second signal 206 are transmitted consecutively, thus reducing the transmission time difference between the first signal 204 and the second signal 206. Consecutive transmission of the first signal 204 and the second signal 206 is especially advantageous when the transmission channel 210, 212 fades rapidly relative to the signal transmission rate of the first signal 204 and the second signal 206. A reduced transmission time between the two signals 204 and 206 improves the correlation between the two signals 204 and 206.

In an embodiment of the invention, the antenna hopping may be implemented by first timing an antenna hop 214, 216 in carrier transmission with respect to signal transition 250 from the first signal 204 to the second signal 206 such that there is a predetermined time gap 246, 248 between the signal transition 250 and the antenna hop 214, 216 between the at least two antenna elements 228, 230. After timing the antenna hop in the carrier transmission, the antenna hop 214, 216 may be based on the timing 238, 240 of the antenna hop 214, 216. The predetermined time gap 246, 248 is for example, the duration of a time slot.

The predetermined time gap 246 between the signal transition 250 and the preceding antenna hop 214 ensures, for example, that the period of the first signal 204 subjected to the measurement carried by the mobile station 106 is sufficient. In an embodiment, the predetermined time gap 246 between the signal transition 250 and the preceding antenna hop 214 may be the order of the duration of the first signal 204.

The predetermined time gap 248 between the signal transition 250 and the antenna hop 216 succeeding the signal transition 250 ensures, for example, that a sufficient portion of the second signal 206 remains correlated. In an embodiment, the predetermined time gap 248 between the signal transition 250 and the succeeding antenna hop 216 may be the order of duration of the second signal 206.

In an embodiment of the invention, the carrier carries the first signal 204 including a first time slot and the second signal 206 including a second time slot. At least a portion of the first time slot may be subjected to a measurement for adjusting receive characteristics of a mobile station 106 for reception of at least a portion of the second time slot. Antenna hopping may be applied to the carrier such that the at least a portion of the first time slot and the at least a portion of the second time slot are transmitted during an interval 224 between the two consecutive antenna hops 214, 216. In terms of a TDMA method (Time Division Multiple Access) and especially GSM terminology, the first signal 204, the second signal 206, and the third signal 208 correspond to three bursts. Each signal transfers a burst-specific time slot in a TDMA frame structure including eight time slots. For the ease of description, the first time slot, the second time slot, and the third time slot are indicated with the same reference numerals as the first signal 204, the second signal 206, and the third signal 208, respectively. The diversity gain arises from, for example, using different antennas 228, 230 in transmitting consecutive first signals 204 when the first signal is interleaved over a number of frames.

FIG. 2 further exemplifies a frame structure of a TDMA transmission. Each frame includes an equal number of time slots 204, 206, 208 confined by two consecutive TDMA frame edges 236, 232, 234. In the exemplified case, the TDMA frame edges 236, 232, 234 are located between the first time slot 204 and the second time slot 206, which in a GSM numbering scheme correspond to a time slot 7 and a time slot 0, respectively. In FIG. 2, the example shows the process of applying an antenna hop 214, 216 between two consecutive frames i.e. during a TDMA frame edge 232, 234, 236 would lead to discontinuity in the spatial transmission channel 210, 212 between the first time slot 204 and the second time slot 206, and a resulting failure in reception of the second time slot 206.

In an embodiment of the invention, the second signal 206 transfers a broadcast channel, which is received by applying the receive characteristics adjusted based on the measurement of the first signal 204. A broadcast channel is a common channel transmitted to the entire cell area of the base transceiver station 102, 104 in order to provide cell information for the mobile stations 106 located in the cell. In GSM, the broadcast channel includes the following channels:

a frequency correction channel (FCCH)
synchronization channel (SCH)
broadcast control channel (BCCH).

The broadcast control channel transfers cell information, such as carrier frequencies available in the cell, channel combinations and frequency hopping sequences, applied by the base transceiver station 102, 104 transmitting the broadcast control channel. It is noted that the broadcast control channel provides the information listed above not only from the serving cell but also from the neighbor cells, thus controlling the cell handover from one cell to another. For example, in terms of the GSM, a carrier carrying the broadcast channel is called a BCCH carrier according to the broadcast control channel transferred by the carrier. When the second signal 206 transfers a broadcast channel, the resulting diversity gain provides improved reliability in the broadcast channel transfer.

In an embodiment of the invention, the second signal 206 transfers a common control channel (CCCH), which is received by applying the receive characteristics adjusted based on the measurement of the first signal 204. A common control channel is a channel transmitted to the entire cell area of the base transceiver station 102, 104 in order to provide signaling information to the mobile station 106 located in the cell. In GSM, the common control channel includes the following channels:

a paging channel (PCH)
a random access channel (RACH)
an access grant channel (AGCH)

A paging channel is used, for example, for call set-up and is transmitted at a relatively low rate. However, if antenna hopping is not applied the reception of the paging channel may fail. As a result, the reception of the paging channel is repeated, resulting in a delay in the call set-up and an increase in the power consumption of the mobile station 106. The invention provides more reliability in the paging channel reception and call establishment.

In an embodiment shown in FIG. 2, the carrier carrying the first signal 204 and the second signal 206 transmitted from the base transceiver station 102, 104 carries the third signal 208 transferring a traffic channel (TCH). The traffic channel may be, for example, a full rate traffic channel (TCF/F), a half rate traffic channel (TCF/H), or an enhanced full rate traffic channel (TCF/EF) utilized by a GSM system. The invention enables applying antenna hopping to the entire carrier, including traffic channels, thus providing diversity gain and capacity increase in the downlink user data transfer.

In an embodiment of the invention, the carrier transmitted from the base transceiver station 102, 104 carries the third signal 208 transferring a dedicated control channel, such as the SDCCH (Stand-alone Dedicated Control Channel), SACCH (Slow Associated Control Channel), and FACCH (Fast Associated Control Channel). The invention enables applying antenna hopping to dedicated control channels, thus providing diversity gain and capacity increase in the dedicated signaling.

In an embodiment of the invention, frequency hopping is applied to the transmission of the base station 102, 104 by using the carrier carrying the first signal 204 and the second signal 206. In frequency hopping, the carrier frequency of the carrier carrying the first signal 204 and the second signal 206 is included in the frequency hopping sequence. A frequency hopping may apply, for example, random or cyclic sequences. Frequency hopping and implementation of the frequency hopping is known to one skilled in the art, and will not be described in further detail. Especially, in the GSM system, the antenna hopping enables the frequency hopping to BCCH and CCCH channels, which frequency hopping is not available in a prior art GSM system.

In an embodiment of the invention, the antenna hopping is applied to the carrier according to a predetermined antenna hopping sequence 200 including at least one antenna hop interval 222, 224, 226 between two consecutive antenna hops 218, 214, 216, 220. The antenna hopping sequence 200 may define at least one of the following:

antenna weighting applied to the at least two antenna elements 228, 230 during the antenna hop interval 222, 224, 226 timing 238, 240, 242, 244 of the antenna hops 218, 214, 216, 220

The details in the antenna hopping sequence 200 affect the diversity gain obtained by the antenna hopping and thus also the performance of the cellular telecommunication system.

The antenna hopping sequence 200 may range from the duration of a few time slots to the duration of several frames. In an embodiment, the antenna hopping sequence 200 may cover a GSM multi-frame or a super-frame.

The antenna hop sequence 200 may be optimized based on the following criteria:

- effect of the antenna hopping sequence on the performance of a traffic channel carried by the carrier
- effect of the antenna hopping sequence on the performance of a common control channel carried by the carrier
- effect of the antenna hopping sequence on the performance of a broadcast channel carried by the carrier
- effect of the antenna hopping sequence on the performance of a dedicated control channel carrier by carrier
- feedback information from the mobile station
- effect of the antenna hopping sequence on the capacity of the cellular telecommunication system
- effect of the antenna hopping sequence combined with frequency hopping on the performance The effect of the antenna hopping sequence 200 on the performance of the traffic channel, the common control channel, the broadcast channel, and the dedicated control channel may be estimated on a theoretical basis, and the antenna hopping sequence 200 may be designed accordingly. When a slow channel is transmitted, which is the case with SACCH (Slow Associated Control Channel), for example, it is desirable to design the antenna hop sequence 200 such that the slow channel is transmitted evenly from each antenna element 228, 230 included in the antenna hopping sequence 200

In an embodiment, the mobile station 106 may evaluate the quality of a signal corresponding to the antenna hopping interval 224, 226, 222, and provide feedback information on the quality for the base transceiver station 102, 104. The base transceiver station 102, 104 may rank antenna configurations corresponding to each antenna hopping interval 224, 226, 222 on the basis of the feedback information, and design the antenna hopping sequence 200 such that an antenna configuration providing a good signal path is used more than an antenna configuration with a poorer signal path.

In an embodiment, the antenna hop sequence 200 is optimized within each interleaving period for logical channels, such as the traffic channel, to maximize the de-correlation of each logical channel during the antenna hop sequence 200. If frequency hopping is used, the antenna hopping may be optimized for frequency hopping within an interleaving period. If the same frequency is repeated during the interleaving period, a different antenna element 228, 230 is preferably used than during the previous transmission of the same frequency. If the number of frequencies in a frequency hopping sequence is smaller than a number of bursts in the interleaving period, it is preferable to re-use antenna-frequency combinations such that the antenna-frequency combinations maximize the de-correlation.

In an embodiment of the invention, timing 238, 240, 242, 244 of the antenna hop 214, 216, 218, 220 is cycled in the antenna hopping sequence 200. For example, in the antenna hopping sequence 200 shown in FIG. 2, the timing 238, 240, 242, 244 is shifted by a time slot in successive intervals 222, 224, 226, provided that the antenna hop does not occur between the first signal 204 and the second signal 206. The cycling pattern is not, however, restricted to the given example, but can be implemented in various manners based, for example, on quasi-random cycling.

It is also possible to perform signal measurements in the mobile stations 106 in the cell area, and transmit feedback information about the signal measurements from the mobile stations 106 to the base transceiver station 102, 104.

With further reference to FIG. 2, embodiments of the base transceiver station 102, 104 are described.

In an embodiment, the at least two antenna elements 228, 230 are arranged such that the correlation between the antenna elements 228, 230 is low. The low correlation may be achieved by locating the antenna elements 228, 230 with the minimum spatial separation of the order of a wavelength of the carrier. In an embodiment, the low correlation is achieved with different polarizations of the two antenna elements 228, 230.

The at least two spatial transmission channels 210, 212 may be implemented, for example, by controlling antenna weights ($W_1$, $W_2$) of each antenna element 228, 230 such that a specific set of antenna weights ($W_1$, $W_2$) corresponds to a spatial transmission channel 210, 212.

In an embodiment, the antenna hopping is implemented with low correlating antenna elements 228, 230 by using, for example, antenna weights (0,1) and (1,0). This antenna arrangement corresponds to a situation where one antenna element 228, 230 transmits the carrier while the other antenna element 228, 230 is inactive in transmitting the carrier. It is noted that the antenna elements 228, 230 may simultaneously transmit other carriers.

In an embodiment, the at least two antenna elements 228, 230 may be configured to provide at least two different antenna beam patterns. The antenna beam patterns may be produced by the antenna elements 228, 230 with high correlation, which may be achieved by separating the antenna elements by the minimum separation of the order of half a wavelength of the carrier. When performing an antenna hop 214, 216 in a beam-pattern case, one beam pattern may change to another in a step-like manner or semi-continuously when the direction of the beam patterns is steered. In both cases, the spatial transmission channel SC1, SC2 may be changed from one to another.

Antenna arrangements and methods for providing transmission channel applied to antenna hopping may vary. However, the invention is not restricted to the examples of the presented antenna arrangements and methods for providing transmission channels, but may be applied to any antenna arrangement and a method providing at least two different spatial transmission channels 210, 212.

Figure 3:
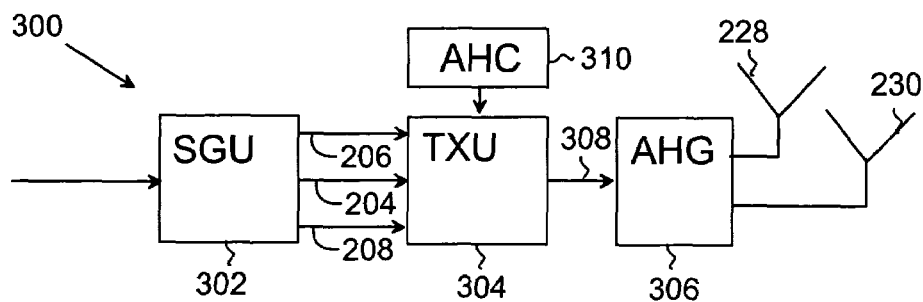
FIG. 3 shows a first example of a structure of a base transceiver station.

In the exemplified base transceiver station 300 shown in FIG. 3, a first signal 204 and a second signal 206 are generated in the signal generating unit 302 and delivered to a transmitter unit 304 connected to the signal generating unit 302. In an embodiment, the first signal 204, the second signal 206, and the third signal 208 are generated digitally using a digital signal processor with software. In another embodiment, the first signal 204 and the second signal 206 are generated using an ASIC (Application Specific Integrated Circuit).

The carrier 308 carrying the first signal 204, the second signal 206, and the third signal 208 is generated in a transmitter unit 304 connected to the signal generating unit 302. In an embodiment, the transmitter unit 304 mixes a carrier radio frequency waveform with base band or intermediate band first signal 204, the second signal 206, and the third signal 208. Thus, the mixing results in the carrier carrying the first signal 204, the second signal 206, and the third signal 208.

The carrier 308 may carry the first signal 204, the second signal 206, and the third signal 208. This results, in one embodiment, in the carrier carrying the first signal 204, the second signal 206, and the third signal 208 is inputted from the transmitter unit 304 into the antenna hop generator 306 connected to the transmitter unit 304. The transmitter unit 304 connects the carrier 308 to the antenna elements 228 and 230 according to an antenna hopping sequence, such as the one shown in FIG. 2.

FIG. 3 shows an antenna hop controller 310 connected to the antenna hop generator 304. The antenna hop controller 310 provides, for example, the antenna hop sequences for the antenna hop generator 304.

Figure 4:
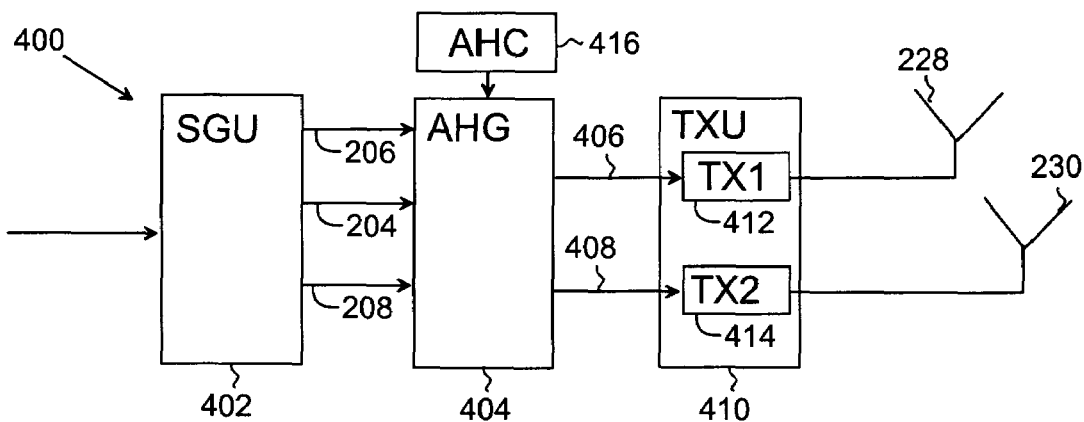
FIG. 4 shows a second example of a structure of a base transceiver station.

FIG. 4 shows an embodiment of a base transceiver station 400, wherein the transmitter unit 410 includes at least two transmitters 412, 414. Each transmitter provides carriers, which are mixed with the first signal 204 and the second signal 206. Each transmitter 412, 414 is connected to the antenna element 228, 230 such that a transmitter-antenna element pair forms an individual signal path in the base transceiver station 300. A signal generator unit 402 generates the first signal 204, the second signal 206, and the third signal 208, which are inputted into the antenna hop generator 404. An antenna hop generator 404 switches the carrier, denoted by 406 or 408, to the transmitter 412, 414 according to the antenna hopping sequence provided by an antenna hop controller 416. The frequency hopping may be implemented by using a switch between the transmitter unit 410 and the antenna elements 228, 230, which switch routes a desired carrier to a desired antenna element 228, 230 according to a frequency hopping sequence. The switch providing the frequency hopping may also be implemented by changing the frequency produced by each transmitter 412, 414 such that the desired frequency hopping sequence is obtained.

Figure 5:
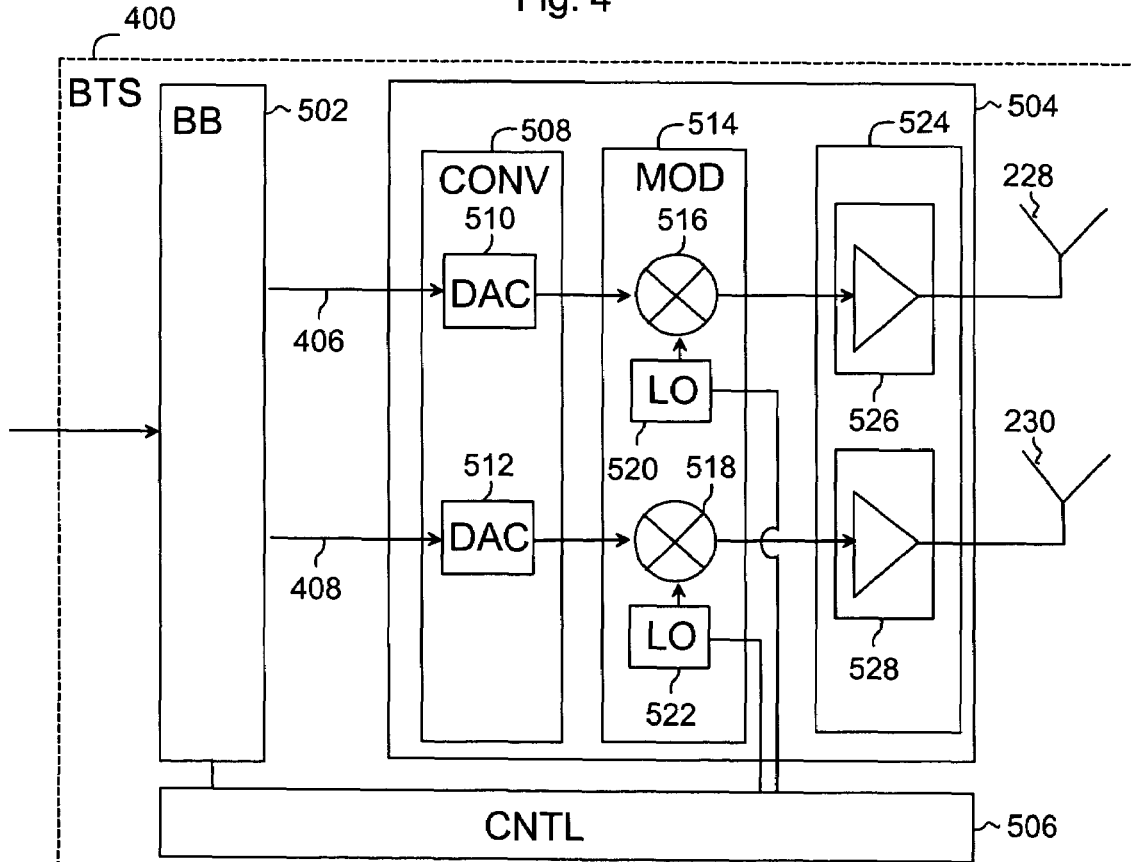
FIG. 5 shows a third example of a structure of a base transceiver station.

FIG. 5 shows an example of a base transceiver station 500 including a base band unit 502, a transmitter unit 504 connected to the base band unit 502 and the antenna elements 228, 230, and a control unit 506 connected to the base band unit 502 and the transmitter 504.

The signal generating unit 302, 402 shown in FIGS. 3 and 4 may be implemented in the base band unit 502 by using a digital signal processor and software and/or an ASIC. The physical channels and the frame structure containing the first signal 204, the second signal 206, and possibly the third signal 208 may be formed in the base band unit 502.

The base band unit 502 outputs a digital base band signal 406, 408 including the first signal 204 and the second signal 206. In an embodiment, the digital base band signal 406, 408 includes the third signal 208.

In an embodiment of the invention, the transmitter unit 504 includes a converter unit 508 for converting digital base band signal 406, 408 received from the base band unit 502 into digital form. In an embodiment, the converter unit 508 includes a plurality of digital-to-analog converters 510, 512, each of which converts a digital base band signal 406, 408 into analog form.

As shown in the example of FIG. 5, the analog form base band signals are inputted into a modulator unit 514, which may include a plurality of mixers 516, 518. Each mixer 516, 518 mixes an analog base band signal with a carrier frequency, thus providing a carrier carrying the first signal 204 and the second signal 206. The carrier frequency may be generated by a mixer-specific local oscillator 520, 522. The local oscillator 520, 522 may be controlled by the control unit 506, which, for example, contains the frequency hopping sequence according to which the local oscillator frequencies and thus the carrier frequencies are controlled.

A carrier generated in each mixer 516, 518 is inputted into an amplifier unit 524 connected to the antenna elements 228, 230, which amplifier unit 524 amplifies the carrier for transmission. The amplifier unit 524 may include a plurality of amplifiers 526, 528, which may amplify each carrier independently.

The transmitter unit 504 provides a plurality of signal paths formed by a chain of digital-to-analog converter 510, 512, a mixer 516, 518, an amplifier 526, 528, and an antenna element 228, 230. The antenna hop generator 306, 404 may be implemented in the base band unit 502 by directing the digital base band signal 406, 408, which includes the first signal 204 and the second signal 206, to a desired signal path. The antenna hopping sequence control, such as timing of the antenna hops 214, 216, 218, 220 according to the invention and the antenna weights, may be stored and managed by the control unit 506 by using a software application or an ASIC.

Furthermore, the mapping of the logical channels, such as the broad-cast channel, to a physical channel may be implemented in the control unit 506.

The antenna hopping sequence 200 may be optimized with an external procedure in the higher layers of the cellular telecommunication system. The antenna hop controller 310, 416 may be implemented with a computer program located in the control unit 506.

According to an aspect, the invention provides a base transceiver station including devices 228, 230, 304, 410, 504 for transmitting a carrier 308 carrying the first signal 204 and the second signal 206. At least a portion of the first signal 204 may be subjected to a measurement for adjusting receive characteristics of the mobile station 106 for reception of at least a portion of the second signal 206, and device 306 for applying antenna hopping to the carrier 308 such that the at least a portion of the first signal 204 and the at least a portion of the second signal 206 are transmitted during the interval 224 between two consecutive antenna hops 214, 216 between the at least two antenna elements 228, 230.

Figure 6:
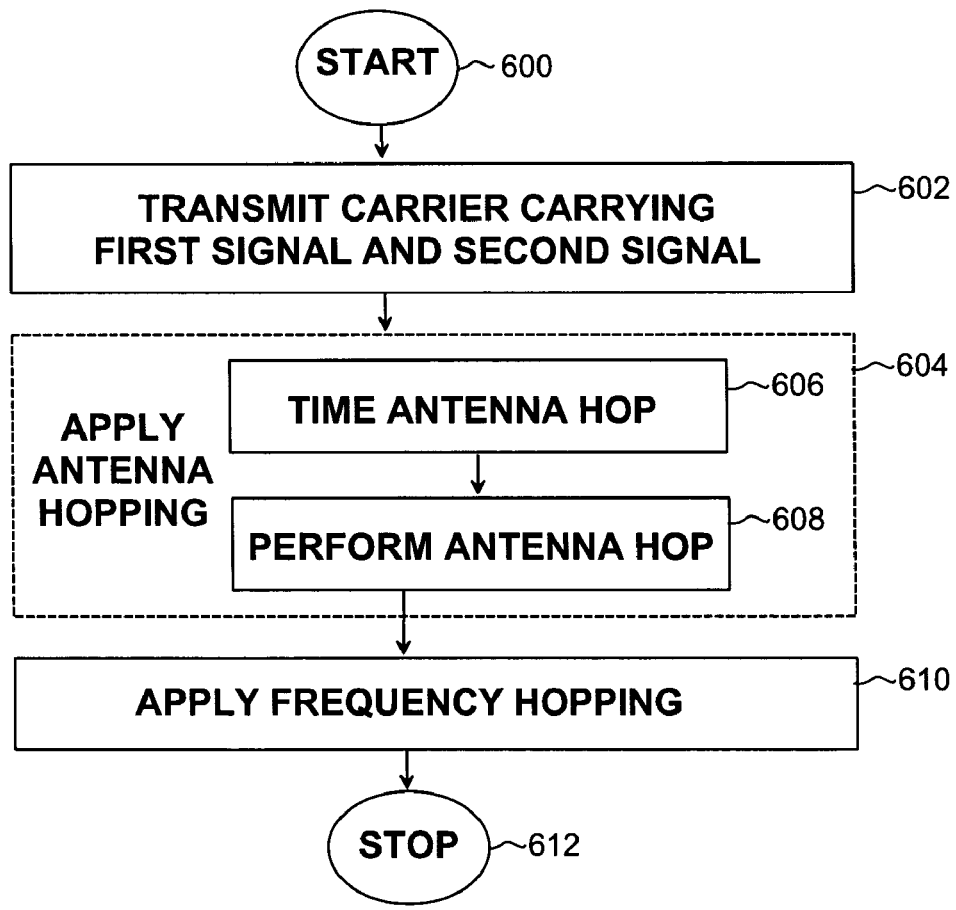
FIG. 6 illustrates methodology according to embodiments of the invention.

The methodology according to embodiments of the invention is demonstrated by way of example using the flow chart shown in FIG. 6. In start 600, the method is started. In 602, the carrier transmitting the first signal 204 and the second signal 206 is transmitted. In 604, antenna hopping is applied to the carrier such that at least a portion of the first signal 204 and at least a portion of the second signal 206 are transmitted during an interval 224 between two consecutive antenna hops 214, 216. In 606, the antenna hop 214, 216 is timed, and the antenna hop 214, 216 is performed. In 610, frequency hopping is applied to the transmission such that the carrier carrying the first signal 204 and the second signal 206 is included in the frequency hopping. In 612, the method is stopped.

Even though the invention is described above with reference to an example according to the accompanying drawings, it is clear that the invention is not restricted thereto but it can be modified in several ways within the scope of the appended claims.

The invention claimed is:

1. A method, comprising:
    transmitting a carrier carrying a first signal and a second signal, wherein at least a portion of the first signal is subjected to a measurement for adjusting receive characteristics of a mobile station for a reception of at least a portion of the second signal; and
    applying antenna hopping to the carrier such that the at least a portion of the first signal and the at least a portion of the second signal are transmitted during an interval between two consecutive antenna hops between at least two antenna elements.

2. A method according to claim 1, wherein the transmitting further comprises transmitting the carrier carrying the first signal, wherein at least a portion of which is subjected to a power measurement for adjusting receive gain of the mobile station for the reception of the at least a portion of the second signal.

3. A method according to claim 1, further comprising:
timing an antenna hop in a carrier transmission with respect to a signal transition from the first signal to the second signal such that there is a predetermined time gap between the signal transition and the antenna hop between the at least two antenna elements; and
performing the antenna hop based on the timing of the antenna hop.

4. A method according to claim 1, wherein the transmitting further comprises transmitting the carrier carrying the first signal and the second signal consecutively.

5. A method according to claim 1, wherein the applying further comprises applying the antenna hopping to the carrier according to a predetermined antenna hopping sequence comprising at least one antenna hop interval between two consecutive antenna hops, wherein the predetermined antenna hopping sequence defining at least one of antenna weighting applied to the at least two antenna elements during an antenna hop interval, and a timing of the antenna hops.

6. A method according to claim 5, wherein the applying further comprises applying the antenna hopping to the carrier according to the predetermined antenna hopping sequence optimized based on at least one of an effect of the predetermined antenna hopping sequence on a performance of a traffic channel carried by the carrier, an effect of the predetermined antenna hopping sequence on a performance of a common control channel carried by the carrier, an effect of the predetermined antenna hopping sequence on a performance of a broadcast channel carried by the carrier, an effect of the predetermined antenna hopping sequence on a performance of a dedicated control channel carried by the carrier, feedback information from the mobile station, or an effect of the predetermined antenna hopping sequence on the capacity of a cellular telecommunication system.

7. A method according to claim 5, wherein the applying further comprises applying the antenna hopping to the carrier according to an antenna hopping sequence which maximizes the de-correlation of at least one channel carried by the carrier within at least one interleaving period.

8. A method according to claim 1, wherein the transmitting further comprises transmitting the carrier carrying the second signal transferring a channel selected from at least one of a broadcast channel or a common control channel.

9. A method according to claim 1, wherein the transmitting further comprises transmitting the carrier carrying a third signal transferring a channel selected from at least one of a traffic channel or a dedicated control channel.

10. A method according to claim 1, further comprising:
applying frequency hopping to a transmission of a base station by using the carrier.

11. A method according to claim 1, wherein the transmitting further comprises transmitting the carrier carrying the first signal comprising a first time slot and the second signal comprising a second time slot,
wherein at least a portion of the first time slot is subjected to a measurement for adjusting the receive characteristics of the mobile station for the reception of at least a portion of the second time slot; and
wherein the applying further comprises applying the antenna hopping to the carrier such that the at least a portion of the first time slot and the at least a portion of the second time slot are transmitted during an interval between the two consecutive antenna hops.

12. An apparatus, comprising:
a signal generator configured to generate a first signal and a second signal, wherein the first signal is subjected to a measurement for adjusting receive characteristics of a mobile station for a reception of at least a portion of the second signal; and
an antenna hop generator configured to apply at least two antenna hops to a carrier carrying the first and second signals to the mobile station such that the at least a portion of the first signal and the at least a portion of the second signal are transmitted during an interval between two consecutive antenna hops between at least two antenna elements.

13. An apparatus according to claim 12, wherein the signal generator is further configured to generate the first signal, wherein at least a portion of which is subjected to a power measurement for adjusting receive gain of the mobile station for the reception of the at least a portion of the second signal.

14. An apparatus according to claim 12, wherein the antenna hop generator is further configured to time an antenna hop in a carrier transmission with respect to a signal transition from the first signal to the second signal such that there is a predetermined time gap between the signal transition and the antenna hop between the at least two antenna elements; and
wherein the antenna hop generator is further configured to perform the antenna hop based on a timing of the antenna hop.

15. An apparatus according to claim 12, further comprising:
an antenna hop controller configured to provide a predetermined antenna hopping sequence comprising an antenna hop interval between two consecutive antenna hops,
wherein the predetermined antenna hopping sequence is configured to define at least one of an antenna weighting applied to the at least two antenna elements during the antenna hop interval and a timing of the antenna hops; and
wherein the antenna hop generator is further configured to apply the at least two antenna hops to the carrier according to the predetermined antenna hopping sequence.

16. An apparatus according to claim 15, wherein the antenna hop controller is further configured to provide an antenna hopping sequence which maximizes a de-correlation of at least one channel carried by the carrier within at least one interleaving period.

17. An apparatus according to claim 15, wherein the antenna hop controller is further configured to provide an antenna hopping sequence optimized based on at least one of an effect of the predetermined antenna hopping sequence on a performance of a traffic channel carried by the carriers; an effect of the predetermined antenna hopping sequence on a performance of a common control channel carried by the carrier, an effect of the predetermined antenna hopping sequence on a performance of a broadcast channel carried by the carrier, an effect of the predetermined antenna hopping sequence on a performance of a dedicated control channel carried by the carrier, an effect of the predetermined antenna hopping sequence on a capacity of a cellular telecommunication system, or feedback information from the mobile station.

18. An apparatus according to claim 12, wherein the signal generator is further configured to generate the second signal transferring a channel selected from at least one of a broadcast channel or a common control channel.

19. An apparatus according to claim 12, wherein the signal generator is further configured to generate the first signal comprising a first time slot and the second signal comprising a second time slot, wherein at least a portion of the first time slot is subjected to a measurement for adjusting the receive characteristics of the mobile station for the reception of at least a portion of the second time slot, and wherein the antenna hop generator is further configured to apply antenna hopping to the carrier such that the at least a portion of the first time slot and the at least a portion of the second time slot are transmitted during an interval between the two consecutive antenna hops.

20. The apparatus of claim 12, further comprising:
a transmitter configured to generate the carrier carrying the first signal and the second signal; and
at least two antenna elements configured to transmit the carrier carrying the first signal and the second signal.

21. An apparatus according to claim 20, wherein the transmitter is further configured to generate the carrier carrying the first signal and the second signal consecutively.

22. An apparatus according to claim 20, wherein the signal generator is further configured to generate a third signal transferring a channel selected from at least one of a traffic channel and a dedicated control channels, and
wherein the transmitter is further configured to generate the carrier carrying the third signal.

23. An apparatus according to claim 20, wherein the transmitter is further configured to generate a plurality of carriers, and
wherein the transmitter is further configured to apply frequency hopping to a transmission of the base station by using the carrier.

24. An apparatus, comprising:
transmitting means for transmitting a carrier carrying a first signal and a second signal, wherein at least a portion of the first signal is subjected to a measurement for adjusting receive characteristics of a mobile station for a reception of at least a portion of the second signal; and
applying means for applying antenna hopping to the carrier such that the at least a portion of the first signal and the at least a portion of the second signal are transmitted during an interval between two consecutive antenna hops between at least two antenna elements.

25. A computer readable storage medium encoded with instructions that, when executed by a computer, perform a process comprising:
transmitting a carrier configured to carry a first signal and a second signal, wherein at least a portion of the first signal is subjected to a measurement for adjusting receive characteristics of a mobile station for a reception of at least a portion of the second signal; and
applying antenna hopping to the carrier such that the at least a portion of the first signal and the at least a portion of the second signal are transmitted during an interval between two consecutive antenna hops between at least two antenna elements.

26. The computer readable storage medium according to claim 25, wherein the transmitting further comprises transmitting the carrier comprising the first signal, wherein at least a portion of which is subjected to a power measurement for adjusting receive gain of the mobile station for the reception of the at least a portion of the second signal.

27. The computer readable storage medium as claimed in claim 25, wherein the instructions, when executed by the computer, further perform the process comprising:
timing an antenna hop in a carrier transmission with respect to a signal transition from the first signal to the second signal such that there is a predetermined time gap between the signal transition and the antenna hop between the at least two antenna elements; and
performing the antenna hop based on the timing of the antenna hop.

28. The computer readable storage medium according to claim 25, wherein the transmitting further comprises transmitting the carrier configured to carry the first signal and the second signal consecutively.

29. The computer readable storage medium according to claim 25, wherein the applying further comprises applying the antenna hopping to the carrier according to a predetermined antenna hopping sequence comprising at least one antenna hop interval between two consecutive antenna hops, wherein the predetermined antenna hopping sequence is configured to define at least one of antenna weighting applied to the at least two antenna elements during an antenna hop interval, or a timing of the antenna hops.

30. The computer readable storage medium according to claim 29, wherein the applying further comprises applying the antenna hopping to the carrier according to the predetermined antenna hopping sequence optimized based on at least one of an effect of the predetermined antenna hopping sequence on a performance of a traffic channel carried by the carrier, an effect of the predetermine antenna hopping sequence on a performance of a common control channel carried by the carrier, an effect of the predetermined antenna hopping sequence on a performance of a broadcast channel carried by the carrier, an effect of the predetermined antenna hopping sequence on a performance of a dedicated control channel carried by the carrier, feedback information from the mobile station, or an effect of the predetermined antenna hopping sequence on the capacity of a cellular telecommunication system.

31. The computer readable storage medium according to claim 29, wherein the applying further comprises applying the antenna hopping to the carrier according to an antenna hopping sequence which maximizes the de-correlation of at least one channel carried by the carrier within at least one interleaving period.

32. The computer readable storage medium according to claim 25, wherein the transmitting further comprises transmitting the carrier carrying the second signal transferring a channel selected from at least one of a broadcast channel or a common control channel.

33. The computer readable storage medium according to claim 25, wherein the transmitting further comprises transmitting the carrier carrying a third signal transferring a channel selected from at least one of a traffic channel or a dedicated control channel.

34. The computer readable storage medium as claimed in claim 25, wherein the instructions, when executed by the computer, further perform the process comprising:
applying frequency hopping to a transmission of a base station by using the carrier.

35. The computer readable storage medium according to claim 25, wherein the transmitting further comprises transmitting the carrier carrying the first signal comprising a first time slot and the second signal comprising a second time slot,
wherein at least a portion of the first time slot is subjected to a measurement for adjusting the receive characteristics of the mobile station for the reception of at least a portion of the second time slot; and
wherein the applying further comprises applying the antenna hopping to the carrier such that the at least a portion of the first time slot and the at least a portion of the second time slot are transmitted during an interval between the two consecutive antenna hops.

* * * * *